United States Patent
Birbara et al.

(10) Patent No.: US 6,364,938 B1
(45) Date of Patent: Apr. 2, 2002

(54) SORBENT SYSTEM AND METHOD FOR ABSORBING CARBON DIOXIDE (CO2) FROM THE ATMOSPHERE OF A CLOSED HABITABLE ENVIRONMENT

(75) Inventors: Philip J. Birbara, Windsor Locks; Thomas P. Filburn, Granby; H. Harvey Michels, West Hartford; Timothy A. Nalette, West Stafford, all of CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 0 days.

(21) Appl. No.: 09/640,440

(22) Filed: Aug. 17, 2000

(51) Int. Cl.⁷ .............................................. B01D 53/04
(52) U.S. Cl. ............................ 95/139; 96/153; 423/228
(58) Field of Search ..................... 25/139, 900; 96/108, 96/153; 423/228

(56) References Cited

U.S. PATENT DOCUMENTS

| | | | |
|---|---|---|---|
| 2,545,194 A | * | 3/1951 | Colburn et al. |
| 3,491,031 A | * | 1/1970 | Stoneburner |
| 4,005,708 A | * | 2/1977 | Netteland et al. |
| 4,091,822 A | * | 5/1978 | Ihring et al. |
| 4,539,189 A | * | 9/1985 | Starkston et al. |
| 4,810,266 A | * | 3/1989 | Zinnen et al. |
| 4,822,383 A | * | 4/1989 | Brose et al. |
| 4,999,175 A | * | 3/1991 | Vansant et al. |
| 5,281,254 A | * | 1/1994 | Birbara et al. |
| 5,376,614 A | * | 12/1994 | Birbara et al. |
| 5,876,488 A | * | 3/1999 | Birbarra et al. |

* cited by examiner

Primary Examiner—Duane S. Smith

(57) ABSTRACT

A regenerable high capacity carbon dioxide ($CO_2$) sorbent is operated to remove substantially all of the $CO_2$ present in either a dry, or a humid environment. The sorbent is an amine compound which is composed predominantly of secondary amine groups, and includes one or more functional nitrile groups. Primary and tertiary amine groups form a minor percent of the sorbent. The reaction product of tetraethylenepentamine (TEPA) and acrylonitrile (AN), which reaction product will be referred to hereinafter as "TEPAN" is a preferred sorbent. The addition of one or more nitrile functional groups to TEPA by reason of the reaction between AN and TEPA converts most of the primary amines in TEPA to secondary amines in TEPAN. We have discovered that the presence of predominantly secondary amines in the sorbent enhances the regenerable cyclic $CO_2$ absorption capacity of the sorbent by more than two and one-half times, as compared to a TEPA sorbent bed; and the use of TEPAN as the sorbent bed also significantly reduces amine volatility to low levels which are immeasurable. The sorbent bed of this invention is also easily regenerable.

10 Claims, 1 Drawing Sheet

SORBENT SYSTEM AND METHOD FOR ABSORBING CARBON DIOXIDE (CO2) FROM THE ATMOSPHERE OF A CLOSED HABITABLE ENVIRONMENT

TECHNICAL FIELD

The present invention relates to an improved regenerable sorbent, method and system for absorbing carbon dioxide ($CO_2$) from a habitable environment. More particularly, this invention relates to a $CO_2$ sorbent which performs equally well in a high or in a low humidity environment.

BACKGROUND OF THE INVENTION

Exposure to carbon dioxide partial pressures which exceed about 7.6 mm Hg (millimeters of mercury, partial pressure of about 1%), for extended periods of time are known to cause health problems in human beings and in other mammals. As a result, in enclosed environs such as those existing in submarines, spacecrafts or space suits, carbon dioxide partial pressures are typically maintained below about 1% through the use of solid carbon dioxide sorbents such as soda lime, zeolite and carbon molecular sieves, solid oxides, alkali metal carbonates, alkali metal hydroxides, amines, and combinations of the aforesaid sorbents.

The aforesaid $CO_2$ sorbent methodologies are sensitive to the relative humidity of the environs in which they are being utilized, and generally will operate at a higher efficiency with higher relative humidity, and with lower efficiency at a lower relative humidity. Conventional $CO_2$ sorbents require an atmosphere dew point, exceeding about 2° C. It would be highly desirable to provide a $CO_2$ sorbent and a method for absorbing $CO_2$ from environs, in which the sorbent is not sensitive to the relative humidity of the environs being desorbed.

DISCLOSURE OF THE INVENTION

This invention relates to a carbon dioxide sorption system and method which increases the regenerable $CO_2$ sorption capacity of the sorbent by more than twice that of the above-noted prior art $CO_2$ sorbents. The regenerable $CO_2$ sorbent used in the system and method of this invention is also not sensitive to the relative humidity in the closed environment atmosphere. The sorbent is a regenerable high capacity amine sorbent which continuously removes $CO_2$ from the atmosphere in enclosed environments. The sorbent is composed of a molecular entity which contains predominantly secondary amines and one or more nitrile functional groups. A preferred sorbent is a reaction product of tetraethylenepentamine (TEPA) and acrylonitrile (AN). AN has the following molecular structure: $H_2C=CHC\equiv N$. The reaction of TEPA with AN substantially converts TEPA's primary amines to secondary amines. This conversion enhances the regenerable cyclic $CO_2$ sorption capacities by more than 2.5 times, and significantly reduces amine volatility to essentially immeasurable levels. One reaction product of TEPA and AN, which we refer to herein as TEPAN, is a reaction product resulting from the combination of 1.0 mole TEPA and 3 moles AN, wherein a branched acyclic form of TEPAN shown below is formed.

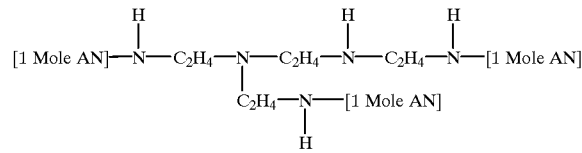

Another reaction product of TEPA and AN, is a compound resulting from the combination of 1.0 mole TEPA and 2 moles AN, wherein a non-branched acyclic form (shown below) is formed.

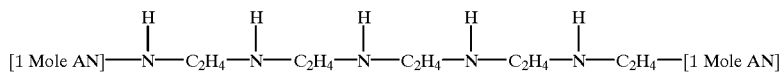

The reaction of TEPA with 1 to approximately 3 moles and AN which forms either branched or straight chain cyclic and non-cyclic reaction products which are generally referred to as TEPAN. It is noted that TEPA includes several acyclic and cyclic amine components wherein overall there are approximately 40% primary, 45% secondary, and 15% tertiary amines. The acyclic and cyclic amine groups in TEPA are approximately equal in content. It has been determined that when one mole of TEPA and 2.3 moles of AN are reacted, the AN reactant reacts preferentially with the primary amines in TEPA so as to substantially increase the ratio of secondary amines to primary amines from a ratio of approximately 1/1 to a ratio of approximately 10/1. Thus, the resultant combination of TEPAN molecules contains approximately 8% primary amine groups, 78% secondary amine groups, and 14% tertiary amine groups. Thus, the TEPAN formed from 1 mole of TEPA and 2.3 moles of AN is comprised predominantly of secondary amine functional groups and nitrile functional groups in a ratio of about 1.5/2.0 (amine/nitrile).

The TEPAN sorbent is applied to a polymeric support structure. The polymeric support structures including acrylic esters are particularly desirable. The stability of the aforesaid amine sorbent enables its long term use in removing $CO_2$ from enclosed environments. We have demonstrated that the TEPAN sorbents of this invention are capable of removing $CO_2$ for periods approaching one year in duration without significant degradation and loss of performance. Sorbent beds formed in accordance with this invention exhibit essentially no release of amines or their degradation products during use. The ability of the sorbent bed to operate equally efficiently in both high and low humidity conditions is unique.

It is therefore an object of this invention to provide a carbon dioxide ($CO_2$) sorbent system and method which is highly stable and has a long operating life.

It is an additional object of this invention to provide a system and method of the character described which is equally efficient in absorbing $CO_2$ in either a high humidity or a low humidity environment.

It is a further object of this invention to provide a system and method of the character described wherein the sorbent can be regenerated in situ.

It is another object of this invention to provide a system and method of the character described wherein the sorbent is a molecular entity which is composed of predominantly secondary amines with one or more nitrile functional groups.

BRIEF DESCRIPTION OF THE DRAWINGS

These and other objects of the invention will become more readily apparent from the following detailed description thereof when taken in conjunction with the accompanying drawing in which.

SPECIFIC MODE FOR CARRYING OUT THE INVENTION

Figure 1:
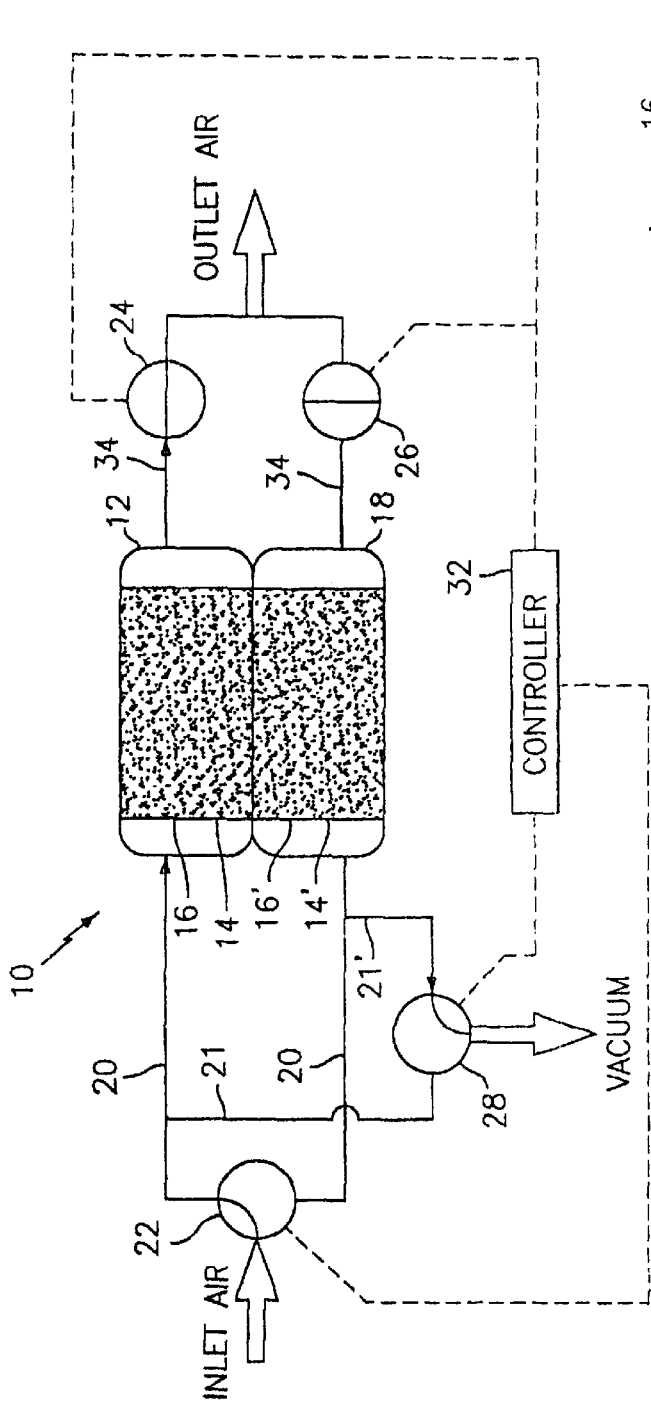
FIG. 1 is a schematic view of a carbon dioxide sorbent bed system which is formed in accordance with this invention.

Referring now to the drawings, FIG. 1 is a schematic view of a $CO_2$ sorption system denoted generally by the numeral 10 which includes a secondary amine/nitrile functional group sorbent of the type described above. The system 10 includes a pair of $CO_2$ sorption beds 12 and 18, each of which contains a sorbent 14, 14' contained in an open cell metallic foam matrix 16 and 16', respectively. Inlet lines 20 extend from the atmosphere in the environ being purged of $CO_2$ to each of the sorption beds 12 and 18. A valve 22 selectively controls which of the inlet lines 20 receives air from the environment being purged so that only one of the beds 12 and 18 is used at any one time to remove $CO_2$ from the air stream. Outlet lines 34 deliver the air from the beds 12 and 18 back into the environment being treated. Valves 24 and 26 are operable to selectively open one of the lines 34 to the passage of the purged air stream. A pre-programmed processor controller 32 is preferably included in the system 10 to control operation of the valves 22, 24 and 26.

From the above description of the system 10, it will be apparent that only one of the beds 12 or 18 is operable to remove $CO_2$ from the air stream at any one time, and that when one bed is sorbing $CO_2$ from the air stream, the other bed is being regenerated. As noted above, the controller 32 determines which bed 12 or 18 is being used as a sorption bed, and which bed is being regenerated.

Desorption of $CO_2$ from the bed 12 or 18 occurs in the following manner. Heat produced in the sorption bed 12 or 18 during the sorption process, by reacting $CO_2$ with either sorbent 14 or 14', is transferred to the other bed 12 or 18 which is being desorbed so as to drive the endothermic desorption process in the other bed 12 or 18, or alternatively, the bed 12 or 18 being desorbed by being exposed to a reduced pressure by means of a vacuum which is applied to the bed being desorbed by means of a valve 28 which connects one of the lines 20 to the bed 12 or 18 to a vacuum source via lines 21 and 21'respectively. The valve 28 is also selectively operated by the controller 32. It will be noted that in the embodiment shown in FIG. 1, both heat and vacuum are used to desorb the beds 12 and 18. FIG. 1 shows the bed 18 in a desorption cycle, wherein the valve 28 connects the bed 18 to the vacuum source via line 21'and the valve 26 is closed to prevent released $CO_2$ from flowing through the outlet end of the system 10.

Figure 2:
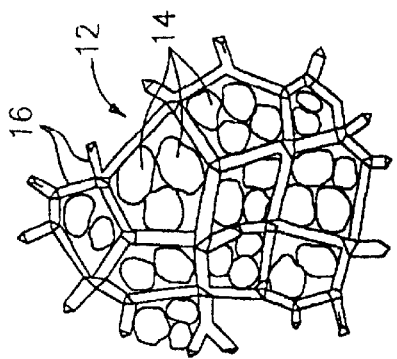
FIG. 2 is a fragmented perspective view of a sorbent bed formed in accordance with this invention.

FIG. 2 shows one way of packing TEPAN absorbent pellets 14 into an open cell matrix 16 in one of the sorption beds 12.

By enhancing the percentage of secondary amine groups in the amine/nitrile sorbent, the result is a highly regenerable sorbent which is not sensitive to the relative humidity of the atmosphere being treated. The predominantly secondary amine compounds described above have been shown to be effective at dew points as, low as −40° C. There are three chemical reactions which can occur in the absorption of $CO_2$ from the atmosphere in the habitable closed environment. Two of the reactions require the presence of water, and thus can occur only in a humid environment. The reactions are:

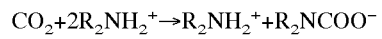

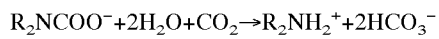

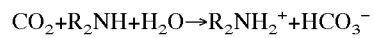

In the absence of water, the first reaction is the primary $CO_2$ absorption reaction. In the presence of water, all three reactions will occur, but the first reaction will remain the primary reaction.

The use of a predominantly secondary amine/nitrile sorbent for absorbing $CO_2$ from a breathable atmosphere greatly enhances the effectiveness of the sorbent and a sorption system using the sorbent due to the fact that the sorbent is not adversely affected by the relative humidity of the atmosphere being treated. This fact also extends the useful life of the sorbent and any system using the sorbent. The switch between sorption and desorption cycles can be preprogrammed into the system controller to be based on a time basis, or can be actuated by means of a $CO_2$ sensor which analysis the exit gas stream from the system.

Since many changes and variations of the disclosed embodiment of the invention may be made without departing from the inventive concept, it is not intended to limit the invention otherwise than as required by the appended claims.

What is claimed is:

1. A system for removing carbon dioxide ($CO_2$) from a breathable air stream, said comprising:
   a) a $CO_2$ sorbent bed which contains a combination amine/nitrile $CO_2$ sorbent, wherein a major proportion of the amine constituent of the sorbent is formed from secondary amine groups, and wherein there is at least one functional nitrile group in the sorbent;
   b) means for introducing the breathable air stream into said sorbent bed; and
   c) means for removing said breathable air stream from said sorbent bed.

2. The system of claim 1 wherein said sorbent is a reaction product of tetraethylenepentamine and an acrylonitrile.

3. The system of claim 1 wherein said sorbent includes an amine constituent which is composed of at least 60% secondary amine groups, no more than 10% primary amine groups, and no more than 20% tertiary amine groups.

4. The system of claim 1 wherein there are a plurality of functional nitrile groups in said sorbent.

5. A method for removing carbon dioxide ($CO_2$) from a breathable air stream so as to produce a lower $CO_2$ level in said air stream, said method comprising:

a) providing an amine/nitrile $CO_2$ absorption bed containing predominantly secondary amine functional groups and at least one nitrile functional group; and b) passing the air stream through the absorption bed.

6. The method of claim 5 wherein the absorption bed contains a reaction product (TEPAN) of tetraethylenepentamine (TEPA) and acrylonitrile (AN).

7. The method of claim 6 wherein one mole of TEPA and 2.3 moles of AN are reacted to form TEPAN, which is comprised predominantly of secondary amine functional groups and nitrile functional groups in a ratio of about 1.5 amine/2.0 nitrile.

8. A carbon dioxide sorption bed containing a sorbent which includes predominantly secondary amine functional groups and at least one nitrile functional group.

9. A carbon dioxide sorbent including predominantly secondary amine functional groups and at least one nitrile functional group.

10. Carbon dioxide ($CO_2$) sorbent resulting from a reaction of 1 mole of tetraethylenepentamine (TEPA) and 3 moles of an acrylonitrile (AN).

* * * * *

UNITED STATES PATENT AND TRADEMARK OFFICE
CERTIFICATE OF CORRECTION

PATENT NO. : 6,364,938 B1 Page 1 of 1
APPLICATION NO. : 09/640440
DATED : April 2, 2002
INVENTOR(S) : Birbara et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (0) days Delete the phrase "by 0 days" and insert -- by 44 days --

Signed and Sealed this

Eighth Day of July, 2008

JON W. DUDAS
*Director of the United States Patent and Trademark Office*